United States Patent
Wang et al.

(10) Patent No.: US 12,292,340 B2
(45) Date of Patent: *May 6, 2025

(54) INDOOR FIRE MONITORING BASED ON LOOK-UP-FROM-FLOOR SENSING OF CEILING

(71) Applicant: THE HONG KONG POLYTECHNIC UNIVERSITY, Hong Kong (CN)

(72) Inventors: Qixin Wang, Hong Kong (CN); Xinyan Huang, Hong Kong (CN); Muhammad Shaheer, Hong Kong (CN); Tamzid Mohammad, Hong Kong (CN); Xiaoning Zhang, Hong Kong (CN); Mingchun Luo, Hong Kong (CN); Li-Ta Hsu, Hong Kong (CN); Xiqiang Wu, Hong Kong (CN); Fu Xiao, Hong Kong (CN); Asif Usmani, Hong Kong (CN)

(73) Assignee: THE HONG KONG POLYTECHNIC UNIVERSITY, Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,877

(22) Filed: Dec. 5, 2023

(65) Prior Publication Data
US 2024/0167888 A1    May 23, 2024

Related U.S. Application Data

(63) Continuation of application No. 17/445,737, filed on Aug. 24, 2021, now Pat. No. 11,860,043.

(51) Int. Cl.
*G01K 3/14*    (2006.01)
*A62C 3/00*    (2006.01)
(Continued)

(52) U.S. Cl.
CPC .............. *G01K 3/14* (2013.01); *A62C 3/00* (2013.01); *A62C 99/009* (2013.01); *G01K 13/00* (2013.01); *H04Q 9/00* (2013.01)

(58) Field of Classification Search
CPC .... G01K 3/14; G01K 13/00; G01K 2003/145; A62C 3/00; A62C 99/009; H04Q 9/00; H04Q 2209/40
See application file for complete search history.

(56) References Cited

U.S. PATENT DOCUMENTS

| | | | | |
|---|---|---|---|---|
| 7,658,232 | B2* | 2/2010 | Anderson | A62C 35/02 169/37 |
| 2005/0128071 | A1* | 6/2005 | Faltesek | G08B 17/00 340/506 |
| 2007/0115134 | A1* | 5/2007 | Smith | G08B 17/10 340/693.6 |

FOREIGN PATENT DOCUMENTS

| | | | |
|---|---|---|---|
| JP | 2006201961 A | * | 8/2006 |
| JP | 2017027610 A | * | 2/2017 |

* cited by examiner

*Primary Examiner* — An T Nguyen
(74) *Attorney, Agent, or Firm* — S&F/WEHRW

(57) ABSTRACT

In an indoor environment on fire, automatic deployment of sensors disposed on, beneath or over the floor to look upward the ceiling to observe a body of smoke and flame risen near the ceiling allows important information regarding states and dynamics of the body of smoke and flame to be gathered at an early stage of fire (e.g. before arrival of firefighters). By distributing the sensors over the indoor environment, the states and dynamics of the body of smoke and flame are monitored holistically (i.e. as a whole) even at the early stage of fire. Such information is useful to predict development of the fire. In one implementation, a sensor is held in an infrastructure sensor holder mounted on the ceiling during normal time. Upon detecting occurrence of (Continued)

fire, the sensor drops from the holder to land on the floor and orients a sensing direction vertically upward to perform monitoring.

20 Claims, 3 Drawing Sheets

(51) Int. Cl.
*A62C 99/00* (2010.01)
*G01K 13/00* (2021.01)
*H04Q 9/00* (2006.01)

INDOOR FIRE MONITORING BASED ON LOOK-UP-FROM-FLOOR SENSING OF CEILING

CROSS-REFERENCE TO RELATED APPLICATIONS

This application is a continuation of U.S. Non-Provisional patent application Ser. No. 17/445,737 filed Aug. 24, 2021, the disclosure of which is incorporated herein by reference in its entirety.

LIST OF ABBREVIATIONS

AP Access point
IoT Internet of Things
LAN Local area network
RF Radio frequency
UAV Unmanned aerial vehicle
WiFi Wireless Fidelity
WLAN Wireless local area network
WSN Wireless sensor network

FIELD OF THE INVENTION

The present invention generally relates to fire monitoring in an indoor environment on fire. Particularly, the present invention relates to monitoring progress of a fire in the indoor environment having a floor and a ceiling by disposing a plurality of sensors on, beneath or over the floor and remotely sensing a body of smoke and flame in a vertical direction towards the ceiling.

BACKGROUND

To fight fire occurred in an indoor environment, it is important to determine the fire states and predict fire development, especially in the early stage of fire. Particularly, it is important to look-up-from-floor to the ceiling, to monitor the states and dynamics of smoke and flame near the ceiling holistically. Holistic monitoring of smoke and flame is concerned with observing and monitoring the body of smoke and flame as a whole.

Existing technologies feature using infrastructure sensors (e.g., smoke detectors, surveillance cameras, etc.) mounted on the ceiling or on the wall. In contrast, existing infrastructure firefighting sensors are not mounted on the floor to look upward toward the ceiling. However, in a fire, particularly in the early stage of the fire, smoke/flame plume is typically gathered near the ceiling. Hence, the ceiling/wall infrastructure sensors are typically immersed in the smoke/flame plume. Each sensor therefore locally measures a state of fire and flame at a single location such that these sensors cannot monitor the smoke/flame plume holistically.

In the disclosure of Jinyang L I et al, entitled "An automatic and accurate localization system for firefighters," and disclosed in *Proceedings of the 3rd IEEE/ACM International Conference on Internet-of-Things Design and Implementation*, 2018, there are proposals of letting firefighters drop ad hoc wireless sensors on the floor to assist firefighting. However, these proposals neither focus on automatically deploying the sensors since the early stage of fire (particularly, before the firefighters arrive), nor do they focus on orienting the sensors upward to aim at the ceiling, nor do they focus on monitoring the smoke/flame near the ceiling holistically.

There is a need in the art for a look-up-from-floor technique practically deployable at the early stage of fire for monitoring the body of smoke and flame near the ceiling such that the states and dynamics of smoke and flame near the ceiling are monitored holistically.

SUMMARY OF THE INVENTION

A first aspect of the present invention is to provide a method for monitoring progress of a fire in an indoor environment. The indoor environment has a ceiling and a floor.

The method comprises immediately deploying, upon detecting the fire in the indoor environment, a plurality of sensors to sense a body of smoke and flame risen near the ceiling for monitoring states and dynamics of the body of smoke and flame at least at an early stage of the fire. In particular, the deploying of the plurality of sensors to sense the body of smoke and flame comprises the following three steps. In a first step, the plurality of sensors is disposed on, beneath or over the floor such that an individual sensor deployed at a selected location of the floor is closer to the floor than to the ceiling and such that a sensing direction of the individual sensor is oriented vertically towards the ceiling, allowing the individual sensor to remotely sense the body of smoke and flame while avoiding the individual sensor to approach or contact the body of smoke and flame. In a second step, the individual sensor remotely senses the body of smoke and flame in a vertical direction towards the ceiling to thereby generate a sequence of sensed data measured for the selected location. In a third step, the individual sensor transmits the sequence of sensed data to a computing server.

The method further comprises: receiving, by the computing server, a plurality of sensed-data sequences generated from the plurality of sensors at respective selected locations of the floor; and analyzing, by the computing server, the plurality of sensed-data sequences to determine the states and dynamics of the body of smoke and flame over the respective selected locations of the floor, thereby allowing the states and dynamics of the body of smoke and flame to be holistically monitored even at the early stage of the fire.

In certain embodiments, the method further comprises installing one or more first sensors in the indoor environment before occurrence of the fire such that an individual first sensor is held in an infrastructure sensor holder mounted to the ceiling, where the one or more first sensors are included in the plurality of sensors. In addition, the disposing of the plurality of sensors on, beneath or over the floor includes dropping the individual first sensor from the infrastructure sensor holder to the floor.

In certain embodiments, the method further comprises installing one or more second sensors beneath the floor with a corresponding sensing direction of an individual second sensor being oriented vertically towards the ceiling, where the one or more second sensors are included in the plurality of sensors. In addition, the disposing of the plurality of sensors on, beneath or over the floor includes raising the individual second sensor to fully or partially expose the individual second sensor above the floor for remotely sensing the body of smoke and flame.

In certain embodiments, the method further comprises installing one or more third sensors beneath the floor with a corresponding sensing direction of an individual third sensor being oriented vertically towards the ceiling, where the one or more third sensors are included in the plurality of sensors. Optionally, the deploying of the plurality of sensors to sense the body of smoke and flame further comprises removing a protection cover of the individual third sensor so as to enable the individual third sensor to remotely sense the body of smoke and flame.

In certain embodiments, the method further comprises installing one or more fourth sensors in the indoor environment before occurrence of the fire such that an individual fourth sensor is held in an infrastructure sensor holder mounted to the ceiling, where the one or more fourth sensors are included in the plurality of sensors. The individual fourth sensor is connected to the infrastructure sensor holder through a connecting member having a length longer than or equal to a distance between the ceiling and the floor. The distance is measured at a corresponding selected location of the floor for deploying the individual fourth sensor. In addition, the disposing of the plurality of sensors on, beneath or over the floor includes releasing the individual fourth sensor from the infrastructure sensor holder such that the individual fourth sensor drops to the floor.

In certain embodiments, the method further comprises installing one or more fifth sensors in the indoor environment before occurrence of the fire such that an individual fifth sensor is held in an infrastructure sensor holder mounted to the ceiling, where the one or more fifth sensors are included in the plurality of sensors. The individual fifth sensor are connected to the infrastructure sensor holder through a connecting member having a length shorter than a distance between the ceiling and the floor. The distance is measured at a corresponding selected location of the floor for deploying the individual fifth sensor. In addition, the disposing of the plurality of sensors on, beneath or over the floor includes releasing the individual fifth sensor from the infrastructure sensor holder such that the individual fifth sensor is lowered towards and hangs over the floor.

In certain embodiments, the plurality of sensors includes one or more sixth sensors. An individual sixth sensor is arranged to be deployed at a corresponding selected location of the floor for sensing the body of smoke and flame. In addition, the disposing of the plurality of sensors on, beneath or over the floor includes transporting the individual sixth sensor to the corresponding selected location of the floor from elsewhere. In one embodiment, the individual sixth sensor is aerially transported to the corresponding selected location of the floor by an UAV. In another embodiment, the individual sixth sensor is transported to the corresponding selected location of the floor by a mobile robot.

A second aspect of the present invention is to provide an indoor-fire monitoring system for monitoring progress of a fire in an indoor environment. The indoor environment has a ceiling and a floor.

The system comprises a plurality of sensors for sensing a body of smoke and flame risen near the ceiling. An individual sensor deployed at a selected location of the floor is configured to be responsive to a deployment command by disposing the individual sensor on, beneath or over the floor such that the individual sensor is closer to the floor than to the ceiling and such that a sensing direction of the individual sensor is oriented vertically towards the ceiling, allowing the individual sensor to remotely sense the body of smoke and flame while avoiding the individual sensor to approach or contact the body of smoke and flame.

The system further comprises a computing server communicable with the individual sensor. The computing server is configured to: upon determining that the fire has occurred, immediately deploy the plurality of sensors to sense the body of smoke and flame by executing a deployment process, wherein the deployment process comprises sending the deployment command to the individual sensor, commanding the individual sensor to remotely sense the body of smoke and flame in a vertical direction towards the ceiling to thereby generate a sequence of sensed data measured for the selected location, and commanding the individual sensor to transmit the sequence of sensed data to the computing server; receive a plurality of sensed-data sequences generated from the plurality of sensors at respective selected locations of the floor; and analyze the plurality of sensed-data sequences to determine the states and dynamics of the body of smoke and flame over the respective selected locations of the floor, thereby allowing the states and dynamics of the body of smoke and flame to be holistically monitored even at an early stage of the fire.

In certain embodiments, the computing server is wirelessly communicable with the individual sensor.

Other aspects of the present disclosure are disclosed as illustrated by the embodiments hereinafter.

Skilled artisans will appreciate that elements in the figures are illustrated for simplicity and clarity and have not necessarily been depicted to scale.

DETAILED DESCRIPTION

Unless otherwise stated, "vertical direction" means a direction opposite to the direction of gravitational force. Hence, the vertical direction is defined by the gravity. Since the direction of gravitational force is commonly regarded as downward pointing (i.e. pointing to the center of Earth), the vertical direction is upward pointing. The modifier "vertically" is interpreted as "along a vertical direction". For example, "oriented vertically" is interpreted as "oriented along a vertical direction."

As used herein in the specification and appended claims, the term "avoid" or "avoiding" refers to any method to partially or completely preclude, avert, obviate, forestall, stop, hinder or delay the consequence or phenomenon following the term "avoid" or "avoiding" from happening. The term "avoid" or "avoiding" does not mean that it is necessarily absolute, but rather effective for providing some degree of avoidance or prevention or amelioration of consequence or phenomenon following the term "avoid" or "avoiding".

The present invention is concerned with automatically deploying sensors on, beneath or over the floor of an indoor environment to look upward toward the ceiling during a fire for observing the states and dynamics of the smoke and flame near the ceiling holistically. Advantageously, important information on the fire states is gathered and this information is useful to predict the fire development.

Since the present invention adopts a look-up-from-floor approach in observing the flame and smoke, the concept of look-up-from-floor is explained as follows before the present invention is elaborated.

Figure 1:
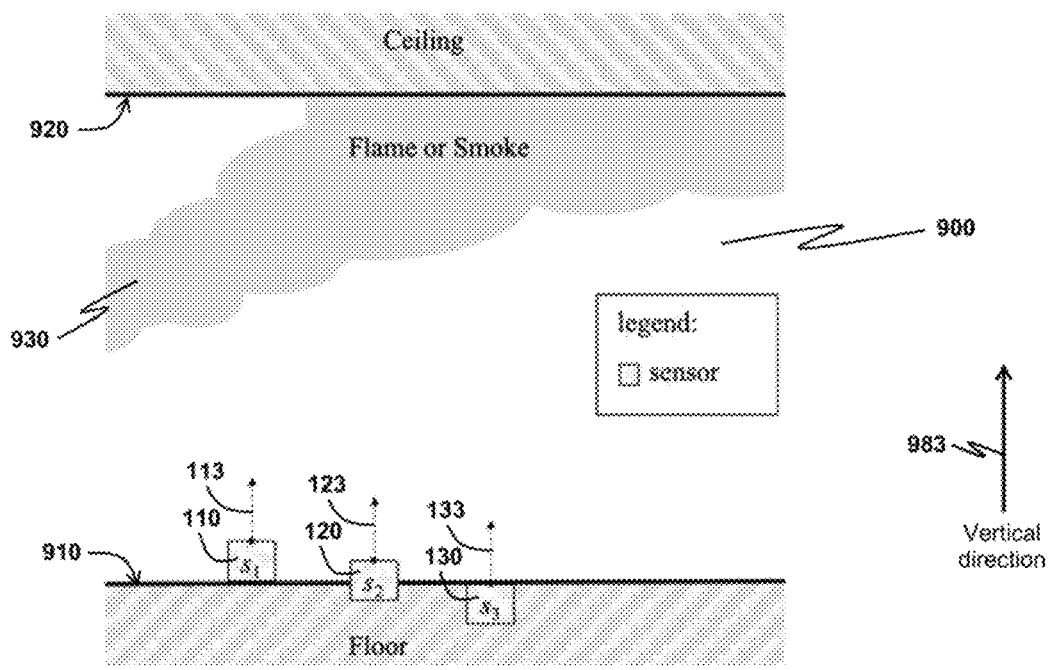
FIG. 1 depicts an indoor environment on fire with a body of smoke and flame and with plural sensors sensing the body of smoke and flame near the ceiling of the indoor environment for illustrating a look-up-from-floor approach in observing the flame and smoke.

FIG. 1 depicts an indoor environment 900 on fire with a body of smoke and flame 930. The indoor environment 900 has a floor 910 and a ceiling 920. A vertical direction 983, which is upward pointing, is defined according to the direction of gravitational force. Herein in the specification and appended claims, positional and directional words such as "above," "below," "higher," "upper," "lower," "top," "bottom," "upward," "downward" and "horizontal" are interpreted with reference to the vertical direction 983. In the indoor environment 900, the body of smoke and flame 930 rises to near the ceiling 920. Sensors 110, 120, 130 are installed in the indoor environment 900 for sensing the body of smoke and flame 930. As examples for illustration, the sensor 110 is installed on the floor 910, a portion of the sensor 120 is buried under the floor 910, and the sensor 130 is positioned beneath the floor 910. These sensors 110, 120, 130 upwardly observe, along sensing directions 113, 123, 133, respectively, the body of smoke and flame 930 risen near the ceiling 920. Hence, the sensors 110, 120, 130 have respective sensing directions 113, 123, 133 oriented along the vertical direction 938.

Starting from the early stage of an indoor fire (typically before firefighters arrive), it is advantageous that the sensors 110, 120, 130 are deployed automatically on the floor 910. These sensors 110, 120, 130, which are oriented upwardly toward the ceiling 920 in the respective sensing directions 113, 123, 133, monitor the body of smoke and flame 930 holistically (i.e. as a whole) over time so as to gather important data on states and dynamics of the body of smoke and flame 930. The obtained data are useful to predict the fire development.

The states and dynamics of the body of smoke and flame 930 include, but are not limited to, the location, velocity, acceleration, shape, size, density, color, texture, temperature, duration, and chemical composition of the body of smoke and flame 930 over the indoor environment 900. These states and dynamics can be recognized directly or indirectly by, for instance, passive sensors that receive images in visible light or infrared, active sensors that employ laser/ultrasonic beams as probing beams, and RF sensors (which are basically sensors that can receive RF signals emitted or bounced back from the environment). With the states and dynamics of the body of smoke and flame 930, one can infer various fire states and predict the fire development. For example, based on the velocity of smoke plume, one can infer the fire source location; based on the color of smoke plume, one can predict backdraft; and based on the duration and temperature of flame, one can predict flashover.

Figure 2:
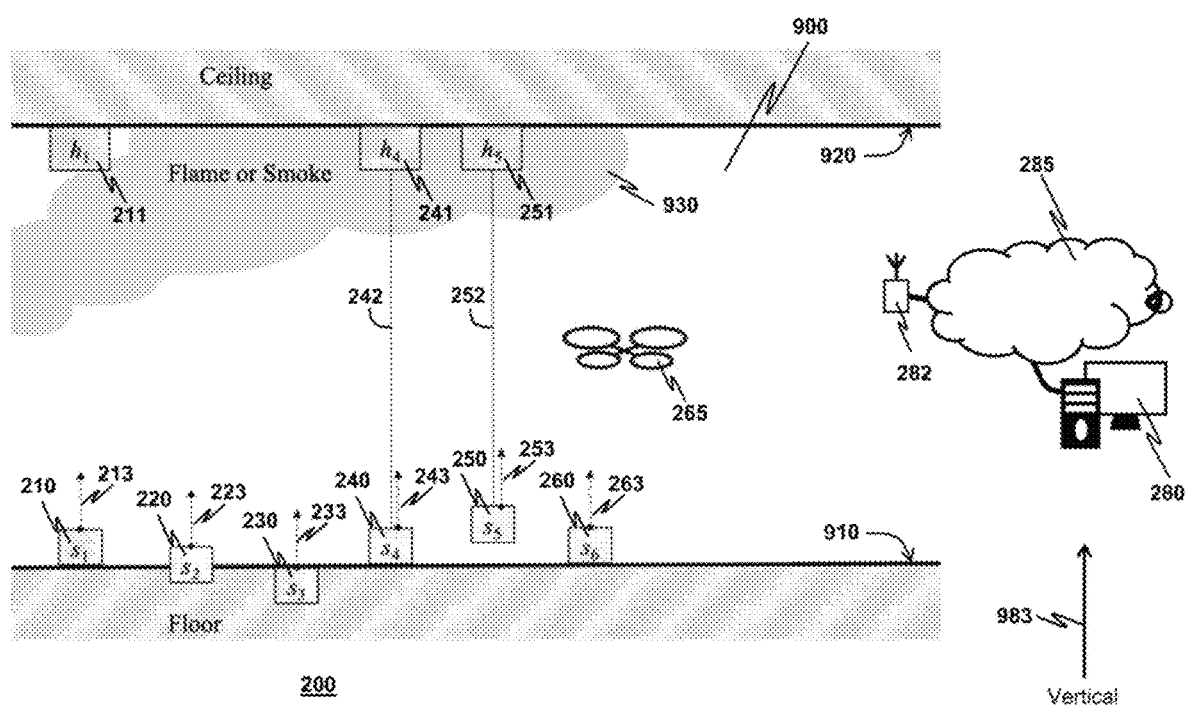
FIG. 2 depicts an indoor-fire monitoring system for monitoring progress of fire in the indoor environment, where the system includes six sensors for illustrating different embodiments of the present invention.
Figure 3:
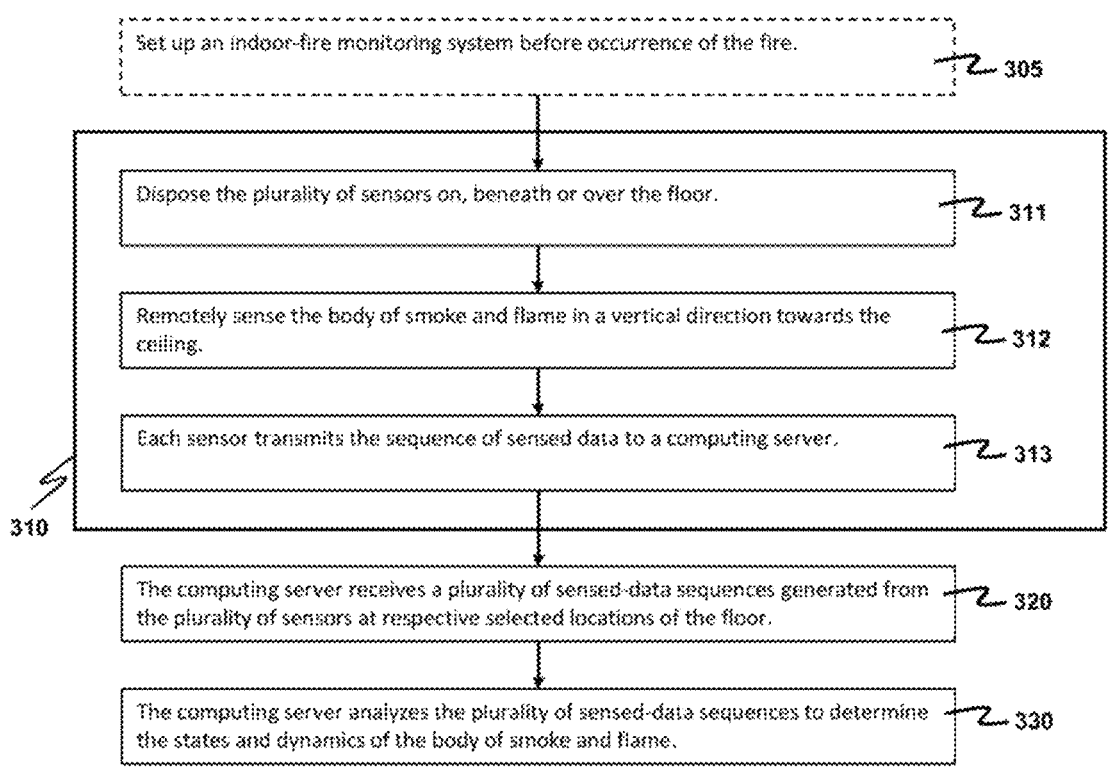
FIG. 3 depicts a flowchart showing exemplary steps of a method for monitoring progress of fire.

Disclosed herein are a method for monitoring progress of a fire in an indoor environment, and an indoor-fire monitoring system that applies the disclosed method to monitor the fire development. The disclosed method and system are illustrated with the aid of FIGS. 2 and 3. FIG. 2 depicts an indoor-fire monitoring system 200 that executes the disclosed method for monitoring the progress of a fire in the indoor environment 900. The fire produces the body of smoke and flame 930. FIG. 3 depicts a flowchart showing exemplary steps of the disclosed method.

The system 200 comprises a plurality of sensors 210, 220, 230, 240, 250, 260 distributed in the indoor environment 900, and a computing server 280 communicable with each sensor in the plurality of sensors 210, 220, 230, 240, 250, 260. The disclosed method comprises steps 310, 320, 330. Optionally, the disclosed method further comprises step 305.

In the step 305, the system 200 is set up before occurrence of the fire. In certain embodiments, the step 305 includes installing the plurality of sensors 210, 220, 230, 240, 250, 260 in the indoor environment 900. The step 305 may further include setting up the computing server 280.

The step 310 is triggered to be initiated when the fire is detected in the indoor environment 900. For instance, the fire is detected by a smoke detector installed at the ceiling 920, or a person in the indoor environment 900 sets off a fire alarm. In the step 310, the plurality of sensors 210, 220, 230, 240, 250, 260, upon detecting the fire in the indoor environment 900, is immediately deployed to sense the body of smoke and flame 930 risen near the ceiling 920. Immediate deployment of the plurality of sensors 210, 220, 230, 240, 250, 260 enables states and dynamics of the body of smoke and flame 930 to be monitored at least at an early stage of the fire. Particularly, the step 310 includes steps 311, 312, 313.

In the step 311, the plurality of sensors 210, 220, 230, 240, 250, 260 is disposed on, beneath or over the floor 910 such that (a) the individual sensor, deployed at a certain selected location of the floor 910, is closer to the floor 910 than to the ceiling 920, and (b) a sensing direction of the individual sensor is oriented vertically towards the ceiling 920. Note that distances from the individual sensor to the floor 910 and from the individual sensor to the ceiling 920 are measured vertically and are non-negative quantities. Also note that the sensors 210, 220, 230, 240, 250, 260 have sensing directions 213, 223, 233, 243, 253, 263, respectively. Advantageously, it allows the individual sensor to remotely sense the body of smoke and flame 930 while avoiding the individual sensor to approach or contact the body of smoke and flame 930. Hence, the possibility of damaging the individual sensor due to immense heat energy, which accumulates near the ceiling 920, as the fire approaches is reduced, thus extending the operating time of the individual sensor before the individual sensor is damaged. After the individual sensor is disposed on, beneath or over the floor 910 in the step 311, the individual sensor remotely senses the body of smoke and flame 930 in the vertical direction 983 towards the ceiling 920 in the step 312. Thereby, a sequence of sensed data measured for the selected location is generated. The individual sensor transmits the sequence of sensed data to the computing server 280 in the step 313.

In the step 320, the computing server 280 receives a plurality of sensed-data sequences generated from the plurality of sensors 210, 220, 230, 240, 250, 260 at respective selected locations of the floor 910.

In the step 330, the computing server 280 analyzes the plurality of sensed-data sequences to determine the states and dynamics of the body of smoke and flame 930 over the respective selected locations of the floor 910. It thereby allows the states and dynamics of the body of smoke and flame 930 to be holistically monitored even at the early stage of the fire. The states and dynamics of the body of smoke and flame 930 is useful for predicting development of the fire in the indoor environment 900. Algorithms for predicting the fire development based on the obtained states and dynamics may be found in the art, e.g., in the disclosure of W. JAHN, "Inverse Modelling to Forecast Enclosure Fire Dynamics," PhD thesis, The University of Edinburgh, 2010.

The plurality of sensors 210, 220, 230, 240, 250, 260 is related to six different implementations of sensors that adopt the look-up-from-floor approach in observing the body of smoke and flame 930. For convenience, the six sensors are denoted as a first sensor 210, a second sensor 220, a third sensor 230, a fourth sensor 240, a fifth sensor 250 and a sixth sensor 260. The selection of these six sensors 210, 220, 230, 240, 250, 260 in the system 200 as shown in FIG. 2 is merely for illustrating different embodiments of the disclosed method. In practical situations, the plurality of sensors used in an indoor-fire monitoring system as disclosed herein may be formed with any number of sensors and any type of look-up-from-floor sensors not limited to the six sensors 210, 220, 230, 240, 250, 260.

The first sensor 210 is held in an infrastructure sensor holder 211 during normal time (namely, before occurrence of the fire). The infrastructure sensor holder 211 is mounted to the ceiling 920. When the fire is detected, the first sensor 210 is released from the infrastructure sensor holder 211, causing the first sensor 210 to freely drop to the floor 910. In certain embodiments, the step 311 includes dropping the first sensor 210 from the infrastructure sensor holder 211 to the floor 910.

Since the sensing direction 213 of the first sensor 210 is required to be oriented vertically towards the ceiling 920 when landing on the floor 910. In one option, the first sensor 210 is equipped with an actuator for rotating the first sensor 210 such that the sensing direction 213 is steered to point upwardly to the ceiling 920 after landing. In a more practical option, the first sensor 210 is realized with a center of gravity close to a bottom of the first sensor 210, making the first sensor 210 behave like a roly-poly toy and thereby automatically orienting the sensing direction 213 vertically towards the ceiling 920 when the first sensor 210 lands on the floor 910.

The second sensor 220 is installed or buried beneath the floor 910 with the sensing direction 223 being oriented vertically towards the ceiling 920. When the fire is detected, the second sensor 220 is raised fully or partially above the floor 910, so that the second sensor 220 is able to look up from the floor 910 to the ceiling 920. In certain embodiments, the step 311 includes raising the second sensor 220 to fully or partially expose the second sensor 220 above the floor 910 for remotely sensing the body of smoke and flame 930.

The third sensor 230 is installed or buried beneath the floor 910 with the sensing direction 233 being oriented vertically towards the ceiling 920. If the sensing direction 233 is unobstructed even if the third sensor 230 is located beneath the floor 910, the third sensor 230 is directly deployable to look up from the floor 910 to observe the body of smoke and flame 930 near the ceiling 920 during the fire. If a protection cover is present in the third sensor 230, the protection cover is removed when the fire is detected. In certain embodiments, the step 311 includes removing the protection cover of the third sensor 230 so as to enable the third sensor 230 to remotely sense the body of smoke and flame 930.

The fourth, fifth and sixth sensors 240, 250, 260 are adaptations to the first sensor 210.

The fourth sensor 240 is held in an infrastructure sensor holder 241 during normal time. The infrastructure sensor holder 241 is mounted to the ceiling 920. When the fire is detected, the fourth sensor 240 is released from the infrastructure sensor holder 241, causing the fourth sensor 240 to descend to the floor 910. Using a similar approach of orienting the sensing direction 213 of the first sensor 210 vertically towards the ceiling 920, the fourth sensor 240 is oriented vertically towards the ceiling 920 when landing on the floor 910. Different from the first sensor 210, the fourth sensor 240 is connected to the infrastructure sensor holder 241 through a connecting member 242. The connecting member 242 has a length longer than or equal to a distance between the ceiling 920 and the floor 910. The distance is measured at a corresponding selected location of the floor 910 for deploying the fourth sensor 240. The connecting member 242 can be a chain, a string, a wire, a communication cable, a pole, or a combination thereof. In certain embodiments, the step 311 includes releasing the fourth sensor 240 from the infrastructure sensor holder 241 such that the fourth sensor 240 drops to the floor 910.

The fifth sensor 250 is held in an infrastructure sensor holder 251 during normal time. The infrastructure sensor holder 251 is mounted to the ceiling 920. When the fire is detected, the fifth sensor 250 is released from the infrastructure sensor holder 251, causing the fifth sensor 250 to descend towards the floor 910. Similar to the fourth sensor 240, the fifth sensor 250 is connected to the infrastructure sensor holder 251 through a connecting member 252. Different from the fourth sensor 240, the connecting member 252 has a length shorter than a distance between the ceiling 920 and the floor 910, where the distance is measured at a corresponding selected location of the floor 910 for deploying the fifth sensor 250. As a result, the fifth sensor 250 is hung over the floor 910 finally. Since the fifth sensor 250 is aligned with the connecting member 252 (which is straight in shape due to a pulling force) when the fifth sensor 250 stops falling, the fifth sensor 250 can be configured such that the sensing direction 253 points vertically to the ceiling 920 after the fifth sensor 250 stops falling. Note that after the fifth sensor 250 is stabilized, the fifth sensor 250 has its center of gravity on an axis that coincides with the connecting member 252, thereby easily making the sensing direction 253 orient vertically. The connecting member 252 can be a chain, a string, a wire, a communication cable, a pole, or a combination thereof. In certain embodiments, the step 311 includes releasing the fifth sensor 250 from the infrastructure sensor holder 251 such that the fifth sensor 250 is lowered towards and hangs over the floor 910.

The sixth sensor 260 is arranged to be deployed at a corresponding selected location of the floor 910 when the fire is detected. In particular, the sixth sensor 260 is transported from elsewhere to the corresponding selected location upon detection of the fire in the indoor environment 900. In one embodiment, the sixth sensor 260 is aerially transported to the corresponding selected location of the floor 910 by an UAV 265. When the UAV 265 reaches the corresponding selected location, the sixth sensor 260 is dropped from the UAV 265 to land on the floor 910. In another embodiment, the sixth sensor 260 is carried to the corresponding selected location by a mobile robot and is subsequently dropped to the floor 910. In both embodiments, by using a similar approach of orienting the sensing direction 213 of the first sensor 210 vertically towards the ceiling 920, the sixth sensor 260 is oriented vertically towards the ceiling 920 when landing on the floor 910.

Note that the first, fourth and fifth sensors 210, 240, 250, which are respectively held in the infrastructure sensor holders 211, 241, 251 mounted on the ceiling 920 before occurrence of the fire, offers an additional advantage that these sensors do not hamper people or furniture when there is no fire.

As mentioned above, the plurality of sensors in the system 200 may be formed with any number of sensors and any type of look-up-from-floor sensors. Under such scenario, various embodiments of the present invention result and are detailed as follows.

In a first embodiment, the plurality of sensors includes one or more copies of the first sensor 210 (hereinafter shorthanded as one or more first sensors). The step 305 includes installing the one or more first sensors in the indoor environment 900 before occurrence of the fire such that an individual first sensor is held in an infrastructure sensor holder mounted to the ceiling 920. The step 311 includes dropping the individual first sensor from the infrastructure sensor holder to the floor 910. The system 200 further includes one or more infrastructure sensor holders mounted to the ceiling 920 and respectively used for holding the one or more first sensors before occurrence of the fire.

In a second embodiment, the plurality of sensors includes one or more copies of the second sensor 220 (hereinafter shorthanded as one or more second sensors). The step 305 includes installing the one or more second sensors beneath the floor 910 with a corresponding sensing direction of an individual second sensor being oriented vertically towards the ceiling 920. The step 311 includes raising the individual second sensor to fully or partially expose the individual second sensor above the floor 910 for remotely sensing the body of smoke and flame 930.

In a third embodiment, the plurality of sensors includes one or more copies of the third sensor 230 (hereinafter shorthanded as one or more third sensors). The step 305 includes installing the one or more third sensors beneath the floor 910 with a corresponding sensing direction of an individual third sensor being oriented vertically towards the ceiling 920. If the individual third sensor has a protection cover, the step 311 includes removing the protection cover of the individual third sensor so as to enable the individual third sensor to remotely sense the body of smoke and flame 930.

In a fourth embodiment, the plurality of sensors includes one or more copies of the fourth sensor 240 (hereinafter shorthanded as one or more fourth sensors). The step 305 includes installing the one or more fourth sensors in the indoor environment 900 before occurrence of the fire such that an individual fourth sensor is held in an infrastructure sensor holder mounted to the ceiling 920, where the individual fourth sensor is connected to the infrastructure sensor holder through a connecting member having a length longer than or equal to a distance between the ceiling 920 and the floor 910. The distance is measured at a corresponding selected location of the floor for deploying the individual fourth sensor. The connecting member may be a chain, a string, a wire, a communication cable, a pole, or a combination thereof. The step 311 includes releasing the individual fourth sensor from the infrastructure sensor holder such that the individual fourth sensor drops to the floor 910. The system 200 further includes one or more infrastructure sensor holders mounted to the ceiling 920 and respectively used for holding the one or more fourth sensors before occurrence of the fire.

In a fifth embodiment, the plurality of sensors includes one or more copies of the fifth sensor 250 (hereinafter shorthanded as one or more fifth sensors). The step 305 includes installing the one or more fifth sensors in the indoor environment 900 before occurrence of the fire such that an individual fifth sensor is held in an infrastructure sensor holder mounted to the ceiling 920, where the individual fifth sensor is connected to the infrastructure sensor holder through a connecting member having a length shorter than the distance between the ceiling 920 and the floor 910. The distance is measured at a corresponding selected location of the floor for deploying the individual fifth sensor. The connecting member may be a chain, a string, a wire, a communication cable, a pole, or a combination thereof. The step 311 includes releasing the individual fifth sensor from the infrastructure sensor holder such that the individual fifth sensor is lowered towards and hangs over the floor 910. The system 200 further includes one or more infrastructure sensor holders mounted to the ceiling 920 and respectively used for holding the one or more fifth sensors before occurrence of the fire.

In a sixth embodiment, the plurality of sensors includes one or more copies of the sixth sensor 260 (hereinafter shorthanded as one or more sixth sensors). An individual sixth sensor is arranged to be deployed at a corresponding selected location of the floor 910 for sensing the body of smoke and flame 930. The step 311 includes transporting the individual sixth sensor to the corresponding selected location of the floor 910 from elsewhere. In one embodiment, the individual sixth sensor is aerially transported to the corresponding selected location of the floor 910 by an UAV. The system 200 further includes one or more UAVs for transporting the one or more sixth sensors. Alternatively, in another embodiment, the individual sixth sensor is transported to the corresponding selected location of the floor by a mobile robot. The system 200 further includes one or more mobile robots for transporting the one or more sixth sensors.

Other implementation details of the disclosed method and the system 200 are elaborated as follows.

The computing server 280 may be implemented as a general-purpose computer, a desktop computer, a workstation, a mainframe computer, a mobile computing device, or any computing machine with appropriate data storage facilities and input/output devices. The computing server 280 may be a physical computer or a distributed server in a computing cloud.

In the system 200 and in executing the disclosed method, the computing server 280 is required to communicate with the plurality of sensors 210, 220, 230, 240, 250, 260.

Since the second and third sensors 220, 230 are located on or beneath the floor 910, the computing server 280 may communicate with the second and third sensors 220, 230 through a wired communication network (such as a LAN) installed in the indoor environment 900. Since the fourth and fifth sensors 240, 250 are connected to the connecting members 242, 252, respectively, the computing server 280 may also communicate with the fourth and fifth sensors 240, 250 through the wired communication network if the connecting members 242, 252 are realized as communication cables.

Instead of using wired communication, it is often more preferable that the computing server 280 is wirelessly communicable with the plurality of sensors 210, 220, 230, 240, 250, 260. Although the computing server 280 can directly wirelessly communicate with the plurality of sensors 210, 220, 230, 240, 250, 260 if, for example, the computing server 280 is realized by a mobile computing device, most often the computing server 280 indirectly communicate with the plurality of sensors 210, 220, 230, 240, 250, 260 wirelessly through an intermediate wireless AP 282. The AP 282 may be advantageously installed in the indoor environment 900 for supporting low-power wireless communication with the plurality of sensors 210, 220, 230, 240, 250, 260. The computing server 280 connects to the AP 282 through a communication network 285, such as the Internet or a LAN.

To support wireless communication between the computing server 280 and the individual sensor, the individual sensor is further equipped with a wireless transceiver. In one option, the plurality of sensors 210, 220, 230, 240, 250, 260 may use a multihop WSN such that any member sensor in the WSN can communicate with the computing server 280 directly, or indirectly through other member sensors in between. In another option, the AP 282 forms a central hub for point-to-point wirelessly communicating with each sensor. The WiFi standard may be used to form a WLAN for wireless communication between the AP 282 and each sensor in the plurality of sensors 210, 220, 230, 240, 250, 260. Alternatively, a terrestrial mobile communication standard may be used for communication between the AP 282 and each sensor, where the AP 282 is a base station of a terrestrial mobile communication system.

Apart from communicating with the plurality of sensors 210, 220, 230, 240, 250, 260, the computing server 280 may also be communicable with the infrastructure sensor holders 211, 241, 251. In certain embodiments, it is achieved by treating the plurality of sensors 210, 220, 230, 240, 250, 260 and the infrastructure sensor holders 211, 241, 251 as IoT devices and forming an IoT wireless network.

In certain embodiments, the computing server 280 is configured to determine that the fire has occurred, e.g., by receiving warnings from smoke detectors installed in the indoor environment 900. Hence, the computing server 280 is responsible for triggering the execution of the step 310. Upon determining that the fire has occurred, the computing server 280 immediately deploys the plurality of sensors 210, 220, 230, 240, 250, 260 to sense the body of smoke and flame 930 by executing a deployment process. In the deployment process, the computing server 280 transmits a deployment command to the plurality of sensors 210, 220, 230, 240, 250, 260 to command the plurality of sensors 210, 220, 230, 240, 250, 260 to execute the steps 311-313. The plurality of sensors 210, 220, 230, 240, 250, 260 is responsive to the deployment command in executing the steps 311-313. In particular, the individual sensor is configured to, upon receiving the deployment command, automatically dispose the individual sensor on, beneath or over the floor 910 such that the individual sensor is closer to the floor 910 than to the ceiling 920 and such that the sensing direction of the individual sensor is oriented vertically towards the ceiling 920.

When the first sensor 210 receives the deployment command, the first sensor 210 may communicate with the infrastructure sensor holder 211 and command the holder 211 to release the first sensor 210 such that the first sensor 210 is dropped to the floor 910 for remotely sensing the body of smoke and flame 930. The fourth and fifth sensors 240, 250 may use a similar approach of communication in commanding respective infrastructure sensor holders 241, 251 with a sensor-release command.

Since the first, fourth and fifth sensors 210, 240, 250 are held in respective infrastructure sensor holders 211, 241, 251 before occurrence of the fire, the first, fourth and fifth sensors 210, 240, 250 may directly send the sensor-release command to the respective infrastructure sensor holders 211, 241, 251 through wired lines instead of using wireless means. It allows flexibility in implementing the system 200.

In addition to receiving the deployment command by the plurality of sensors 210, 220, 230, 240, 250, 260, in certain embodiments the infrastructure sensor holders 211, 241, 251 are also configured and arranged to receive the deployment command from the computing server 280. When the infrastructure sensor holders 211, 241, 251 receive the deployment command, the infrastructure sensor holders 211, 241, 251 are triggered to release the first, fourth and fifth sensors 210, 240, 250, respectively, without a need for these sensors 210, 240, 250 to send out respective sensor-release commands to the holders 211, 241, 251.

The computing server 280 is further configured to execute the steps 320, 330.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for monitoring progress of a fire in an indoor environment, the indoor environment having a ceiling and a floor, the method comprising: upon detecting the fire in the indoor environment, immediately deploying a plurality of sensors to sense a body of smoke and flame risen near the ceiling for monitoring states and dynamics of the body of smoke and flame at least at an early stage of the fire, wherein the deploying of the plurality of sensors to sense the body of smoke and flame comprises: disposing the plurality of sensors on, beneath or over the floor such that an individual sensor deployed at a selected location of the floor is closer to the floor than to the ceiling and such that a sensing direction of the individual sensor is oriented vertically towards the ceiling, allowing the individual sensor to remotely sense the body of smoke and flame while avoiding the individual sensor to approach or contact the body of smoke and flame; remotely sensing, by the individual sensor, the body of smoke and flame in a vertical direction towards the ceiling to thereby generate a sequence of sensed data measured for the selected location; and transmitting, by the individual sensor, the sequence of sensed data to a computing server; receiving, by the computing server, a plurality of sensed-data sequences generated from the plurality of sensors at respective selected locations of the floor; and analyzing, by the computing server, the plurality of sensed-data sequences to determine the states and dynamics of the body of smoke and flame over the respective selected locations of the floor, thereby allowing the states and dynamics of the body of smoke and flame to be holistically monitored even at the early stage of the fire; and further comprising: installing one or more selected sensors beneath the floor with a corresponding sensing direction of an individual selected sensor being oriented vertically towards the ceiling, the one or more selected sensors being included in the plurality of sensors, wherein the disposing of the plurality of sensors on, beneath or over the floor includes raising the individual selected sensor to fully or partially expose the individual selected sensor above the floor for remotely sensing the body of smoke and flame.

2. The method of claim 1, wherein the deploying of the plurality of sensors to sense the body of smoke and flame further includes removing a protection cover of the individual selected sensor so as to enable the individual selected sensor to remotely sense the body of smoke and flame.

3. The method of claim 1 further comprising: installing one or more selected sensors in the indoor environment before occurrence of the fire such that an individual selected sensor is held in an infrastructure sensor holder mounted to the ceiling, the one or more selected sensors being included in the plurality of sensors, the individual selected sensor being connected to the infrastructure sensor holder through a connecting member; wherein the disposing of the plurality of sensors on, beneath or over the floor includes releasing the individual selected sensor from the infrastructure sensor holder such that the individual selected sensor either is lowered to the floor, or is lowered towards and hangs over the floor.

4. The method of claim 3, wherein the connecting member has a length longer than or equal to a distance between the ceiling and the floor such that the individual selected sensor is lowered to the floor when the individual selected sensor is released from the infrastructure sensor holder, the distance being measured at a corresponding selected location of the floor for deploying the individual selected sensor.

5. The method of claim 3, wherein the connecting member has a length shorter than a distance between the ceiling and the floor such that the individual selected sensor is lowered towards and hangs over the floor when the individual selected sensor is released from the infrastructure sensor holder, the distance being measured at a corresponding selected location of the floor for deploying the individual selected sensor.

6. The method of claim 1, wherein: the plurality of sensors includes one or more selected sensors, an individual selected sensor being arranged to be deployed at a corresponding selected location of the floor for sensing the body of smoke and flame; and the disposing of the plurality of sensors on, beneath or over the floor includes transporting the individual selected sensor to the corresponding selected location of the floor from elsewhere.

7. The method of claim 6, wherein the individual selected sensor is aerially transported to the corresponding selected location of the floor by an unmanned aerial vehicle (UAV).

8. The method of claim 6, wherein the individual selected sensor is transported to the corresponding selected location of the floor by a mobile robot.

9. An indoor-fire monitoring system for monitoring progress of a fire in an indoor environment, the indoor environment having a ceiling and a floor, the system comprising: a plurality of sensors for sensing a body of smoke and flame risen near the ceiling, an individual sensor deployed at a selected location of the floor being configured to be responsive to a deployment command by disposing the individual sensor on, beneath or over the floor such that the individual sensor is closer to the floor than to the ceiling and such that a sensing direction of the individual sensor is oriented vertically towards the ceiling, allowing the individual sensor to remotely sense the body of smoke and flame while avoiding the individual sensor to approach or contact the body of smoke and flame; and a computing server communicable with the individual sensor, the computing server being configured to: upon determining that the fire has occurred, immediately deploy the plurality of sensors to sense the body of smoke and flame by executing a deployment process, wherein the deployment process comprises sending the deployment command to the individual sensor, commanding the individual sensor to remotely sense the body of smoke and flame in a vertical direction towards the ceiling to thereby generate a sequence of sensed data measured for the selected location, and commanding the individual sensor to transmit the sequence of sensed data to the computing server; receive a plurality of sensed-data sequences generated from the plurality of sensors at respective selected locations of the floor; and analyze the plurality of sensed-data sequences to determine the states and dynamics of the body of smoke and flame over the respective selected locations of the floor, thereby allowing the states and dynamics of the body of smoke and flame to be holistically monitored even at an early stage of the fire;

wherein: the plurality of sensors comprises one or more selected sensors installed beneath the floor with a corresponding sensing direction of an individual selected sensor being oriented vertically towards the ceiling; and wherein: the individual selected sensor is configured such that when the individual selected sensor receives a corresponding deployment command from the computing server, the individual selected sensor is raised to fully or partially expose the individual selected sensor above the floor for remotely sensing the body of smoke and flame.

10. The system of claim 9, wherein: the individual selected sensor is configured such that when the individual selected sensor receives a corresponding deployment command from the computing server, a protection cover of the individual selected sensor is removed so as to enable the individual selected sensor to remotely sense the body of smoke and flame.

11. The system of claim 9, wherein: the plurality of sensors comprises one or more selected sensors installed in the indoor environment before occurrence of the fire such that an individual selected sensor is held in an infrastructure sensor holder mounted to the ceiling, the individual selected sensor being connected to the infrastructure sensor holder through a connecting member; and the individual selected sensor is configured to, when the individual selected sensor receives a corresponding deployment command from the computing server, release the individual selected sensor from the infrastructure sensor holder such that the individual selected sensor either is lowered to the floor, or is lowered towards and hangs over the floor.

12. The system of claim 11, wherein the connecting member has a length longer than or equal to a distance between the ceiling and the floor such that the individual selected sensor is lowered to the floor when the individual selected sensor is released from the infrastructure sensor holder, the distance being measured at a corresponding selected location of the floor for deploying the individual selected sensor.

13. The system of claim 11, wherein the connecting member has a length shorter than a distance between the ceiling and the floor such that the individual selected sensor is lowered towards and hangs over the floor when the individual selected sensor is released from the infrastructure sensor holder, the distance being measured at a corresponding selected location of the floor for deploying the individual selected sensor.

14. The system of claim 9, wherein: the plurality of sensors comprises one or more selected sensors installed in the indoor environment before occurrence of the fire such that an individual selected sensor is held in an infrastructure sensor holder mounted to the ceiling, the individual selected sensor being connected to the infrastructure sensor holder through a connecting member; the system further comprises one or more respective infrastructure sensor holders for the one or more selected sensors, the infrastructure sensor holder being communicable with the computing server; and the deployment process further comprises commanding the infrastructure sensor holder to release the individual selected sensor such that the individual selected sensor either is lowered to the floor, or is lowered towards and hangs over the floor.

15. The system of claim 14, wherein the connecting member has a length longer than or equal to a distance between the ceiling and the floor such that the individual selected sensor is lowered to the floor when the individual selected sensor is released from the infrastructure sensor holder, the distance being measured at a corresponding selected location of the floor for deploying the individual selected sensor.

16. The system of claim 14, wherein the connecting member has a length shorter than a distance between the ceiling and the floor such that the individual selected sensor is lowered towards and hangs over the floor when the individual selected sensor is released from the infrastructure sensor holder, the distance being measured at a corresponding selected location of the floor for deploying the individual selected sensor.

17. The system of claim 9, wherein: the plurality of sensors includes one or more selected sensors, wherein an individual selected sensor is arranged to be deployed at a corresponding selected location of the floor for sensing the body of smoke and flame, and is arranged to be transported to the corresponding selected location of the floor from elsewhere; and the system further comprises a means for transporting the individual selected sensor to the corresponding selected location.

18. The system of claim 17, wherein the means for transporting the individual selected sensor to the corresponding selected location is a set of one or more unmanned aerial vehicles for aerially transporting the one or more selected sensors.

19. The system of claim 17, wherein the means for transporting the individual selected sensor to the corresponding selected location is a set of one or more mobile robots for transporting the one or more selected sensors.

20. The system of claim 9, wherein the computing server is wirelessly communicable with the individual sensor.

* * * * *